United States Patent [19]

McCoy

[11] Patent Number: 4,491,538
[45] Date of Patent: Jan. 1, 1985

[54] SCHIFF BASE SURFACTANTS

[75] Inventor: David R. McCoy, Austin, Tex.

[73] Assignee: Texaco Inc., White Plains, N.Y.

[21] Appl. No.: 435,131

[22] Filed: Oct. 18, 1982

[51] Int. Cl.$^3$ .............................................. B01F 17/16
[52] U.S. Cl. .............................. 252/541; 252/174.22;
252/523; 252/525; 252/544; 252/355;
252/DIG. 14; 564/278
[58] Field of Search ............... 252/541, 544, 523, 525,
252/174.22, 355; 564/278

[56] References Cited

U.S. PATENT DOCUMENTS 2,765,340 10/1956 Haury .................................. 564/278
3,897,362 7/1975 McCoy ................................ 564/278

OTHER PUBLICATIONS

Pluronic Polyols in Cosmetics, 1968 by Wyandotte Chemicals Corp., pp. 1 and 4.
Etherified Adducts, Surface Active Ethylene Oxide Adducts, N. Schonfeldt, 1969, Pergamon Press.
Jeffamine Poly(Oxyethylene)Diamines, Texaco Chemical Bulletin, 1981.
Jeffamine M-Series, Texaco Chemical Bulletin, 1981.

*Primary Examiner*—Paul Lieberman
*Assistant Examiner*—Hoa Van Le
*Attorney, Agent, or Firm*—Robert A. Kulason; Jack H. Park; Richard A. Morgan

[57] ABSTRACT

A novel group of surface active agents is revealed. These surface active agents are the condensation product of an aldehyde or ketone of from 9 to 20 carbon atoms with a polyoxyalkyleneamine which is an amine terminated block copolymer of oxyethylene and oxypropylene groups.

The Schiff bases of the present invention are characterized by the general formula:

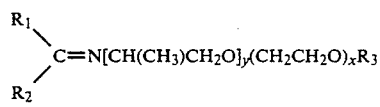

In this general formula, $R_1$ and $R_2$ can either be hydrogen or an alkyl radical such that the sum of carbon atoms in the radical $R_1$—C—$R_2$ is from 9 to 20.

$R_3$ is a radical which may be an alkyl of from 1 to 4 carbon atoms.

$R_3$ is in the alternative the radical
$H_2N[CH(CH_3)CH_2]$—$[OCH(CH_3)CH_2]_y$— or

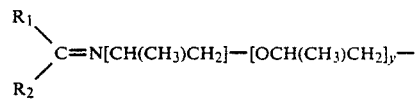

In these formulae, y has an average value of from 1 to 3 and and x has an average value of from 4 to 60 such that the amount of polyoxyethylene in the Schiff base is greater than or equal to 40 wt. %.

9 Claims, No Drawings

SCHIFF BASE SURFACTANTS

BACKGROUND OF THE INVENTION

Field of the Invention

This invention relates to condensates of aliphatic aldehydes and ketones with amino containing reactants. More particularly, this invention relates to a series of hydrolytically stable, water soluble Schiff bases. This group of Schiff bases is useful as surface active agents.

The term surfactant refers to substances which lower liquid-liquid, liquid-solid or liquid-gas interfacial tension. Surfactant solutions used by themselves or in conjunction with cleaning adjuvants such as additives or builders are widely used to wet surfaces, remove soil, penetrate porous materials, disperse particles, emulsify oils and greases, etc., dependent upon the particular characteristics of the surfactant or surfactants used.

Desirably surfactants are inexpensive, light colored materials which function at low concentration levels in aqueous solutions and which can be produced in good yield from readily available low cost starting materials, free from deleterious contaminants, preferably as easily handled, free-flowing liquids or powders.

For many applications, such as heavy duty industrial applications for metal scouring and dishwasher detergent compositions, the compositions necessarily include highly alkaline materials such as alkali metal hydroxides, alkoxides and phosphates. In the aqueous media that these detergents function, the pH of the cleaning solution frequently will be from 10 to 13. For this reason a prerequisite of heavy duty detergency compositions is stability at elevated pH's in aqueous solutions.

Solubilized Schiff bases derived from the condensation of aliphatic ketones with amine-containing reactants are particularly of interest in view of the disclosure of British Pat. No. 414,712 (1933) which states that solubilized (ethoxylated or sulfonated, etc.) Schiff bases prepared by condensing aliphatic aldehydes or ketones of more than 6 carbon atoms with aliphatic amines or amino alcohols produce high foaming detergents stable to hard (alkaline) water. Unfortunately solubilized condensation products as exemplified by the ethoxylated condensate of Schiff bases prepared from the reaction of $C_{11}$–$C_{13}$ ketone mixtures or methyl nonyl ketone with amino-containing reactants such as ethanolamine are extremely unstable in aqueous solutions ranging from pH 5.6 to 13. Inasmuch as this pH range includes most cleaning applications, the unstabilized condensate products of the British Patent are practically of no value as detergent components.

U.S. Pat. No. 3,897,362 (1975) McCoy, describes a series of Schiff base surfactants which are more stable than those of British Pat. No. 414,712 but significantly less hydrolytically stable than the Schiff bases of the present invention as shown in Example VIII.

SUMMARY OF THE INVENTION

This invention relates to a series of Schiff bases which find use as detergents. The Schiff bases of the present invention are characterized by the general formula:

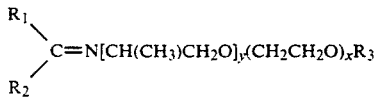

In this general formula,
$R_1$ and $R_2$ can either be hydrogen or an alkyl radical such that the sum of carbon atoms in the radical $R_1$—C—$R_2$ is from 9 to 20.
$R_3$ is a radical which in one embodiment of the present invention is an alkyl of from 1 to 4 carbon atoms.
$R_3$ is in the alternative the radical

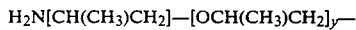

or

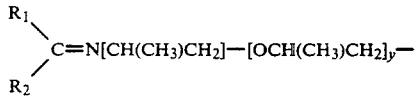

In these formulae, y has an average value of from 1 to 3 and x has an average value of from 4 to 60 such that the amount of polyoxyethylene in the Schiff base is greater than or equal to 40 wt%.

DESCRIPTION OF THE PREFERRED EMBODIMENTS

Aminoalkoxylated Schiff bases are the surfactants of the present invention. These surfactants are derived from condensation at elevated temperatures of aliphatic aldehydes and ketones containing from 9 to 20 carbon atoms with polyoxyalkyleneamines. The polyoxyalkyleneamines are block copolymers of oxyethylene groups and oxypropylene groups terminated with primary amine groups.

In one embodiment of the present invention the condensation is effected with a class of polyoxyalkylene monoamines of the general formula:

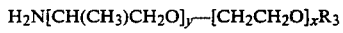

wherein y has an average value of from 1 to 3 and x has an average value of from 4 to 50 and preferably 10 to 30. This class of monoamines has a molecular weight of from about 400 to about 1500. These monoamines are derived from oxyethylene groups (—$CH_2CH_2O$—) and oxypropylene groups (—$CH(CH_3)CH_2O$—).

A commercially available polyoxyalkylene monoamine has been found which conforms to this class and demonstrates particularly beneficial properties. This monoamine can be used to produce Schiff bases wherein the polyoxyethylene portion is not less than 40 wt% of the molecule. This polyoxyalkylene monoamine has a molecular weight of approximately 1000 and is characterized by the general formula:

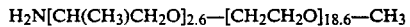

It is understood that this general formula represents the average structure of a mixture of block copolymer monoamines in which in the general formula y is an integer that may vary from 1 to about 5 and x ranges from about 7 to about 30. This polyoxyalkylene monoamine is marketed under the tradename JEFFAMINE ®M-1000 by Texaco Chemical Company.

This class of monoamines is condensed with equimolar quantities of aliphatic aldehydes and/or ketones containing from 9 to 20 and preferably 10 to 15 carbon atoms at elevated temperatures in the presence or absence of inert solvent such as benzene or toluene.

The Schiff base thereby produced is a composition of matter of the general formula:

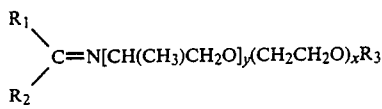

wherein: $R_1$ and $R_2$ are selected from the group consisting of hydrogen and an alkyl radical such that the sum of the carbon atoms in $R_1$—C—$R_2$ is from 9 to 20, $R_3$ is an alkyl radical of from 1 to 4 carbon atoms, y has an average value of from 1 to 3, and x has an average value of from 4 to 50 and preferably 10 to 30 such that the amount of ($CH_2CH_2O$) is not less than 40 wt%.

In another embodiment of the present invention the condensation is effected with a class of polyoxyalkylene diamines of the general formula:

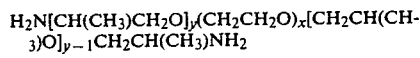

wherein y has an average value of from 1 to 3 and x has an average value of from 8 to 60 and preferably 8 to 50. This class of diamines is derived from oxyethylene groups (—$CH_2CH_2O$—) and oxypropylene groups (—$CH(CH_3)CH_2O$—) and has a molecular weight of from about 600 to about 3000 and preferably from about 900 to about 2000.

Three commercially available polyoxyalkylene diamines have been found that conform to this class that demonstrate particularly beneficial properties. These diamines can be used to produce Schiff bases wherein the ethylene oxide content is not less than 40 wt% of the molecule. The first is the polyoxyalkylene diamine of molecular weight of approximately 600 characterized by the formula:

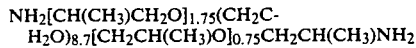

It is understood that these formulae represent a mixture of block copolymer diamines and the amounts of propylene oxide and ethylene oxide designated in the general formula are merely relative mole ratios for the mixture as a whole.

This polyoxyalkylene diamine is marketed under the trademark JEFFAMINE®ED-600 by Texaco Chemical Company.

A second polyoxyalkylene diamine of this general formula has been found which exhibits particularly beneficial properties. This polyoxyalkylene diamine has a molecular weight of approximately 900 and is characterized by the formula:

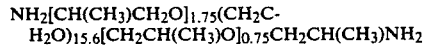

This polyoxyalkylene diamine is marketed under the trademark JEFFAMINE®ED-900 by Texaco Chemical Company.

A third polyoxyalkylene diamine of this general formula has been found which exhibits particularly beneficial properties. This polyoxylakylene diamine has a molecular weight of approximately 2000 and is characterized by the formula:

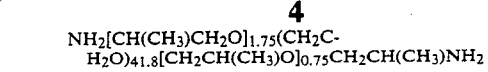

The polyoxyalkylene diamine is marketed under the trademark JEFFAMINE®ED-2001 by Texaco Chemical Company.

This class of diamines is condensed with equimolar or twice molar quantities of aliphatic aldehydes and/or ketones containing from 9 to 20 and preferably 10 to 15 carbon atoms at elevated temperatures in the presence or absence of inert solvent such as benzene or toluene.

The Schiff base thereby produced is a composition of matter of the general formula:

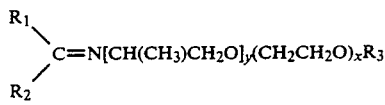

wherein:

$R_1$ and $R_2$ are selected from the group consisting of hydrogen and an alkyl radical such that the sum of the carbon atoms in $R_1$—C—$R_2$ is from 9 to 20, $R_3$ is a radical selected from the group consisting of:

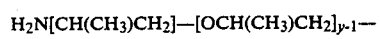

and

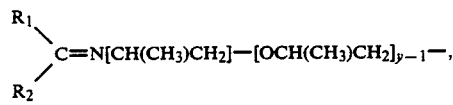

y has an average value of from 1 to 3 and x has an average value of from 8 to 60 and preferably 8 to 50 such that the amount of ($CH_2CH_2O$) is not less than 40 wt%.

The preparation of the Schiff bases of the present invention is conducted at elevated temperatures in the presence or absence of inert solvent such as benzene or toluene while water is formed and removed. The reaction may be carried out with or without the use of catalyst. Catalyst such as p-toluenesulfonic acid, sulfuric acid and acid resins such as AMBERLYST® marketed by Rohm and Haas may be used to synthesize the Schiff bases of the present invention. The general preparation of Schiff bases, including the temperatures, catalysts and solvents utilized is thoroughly described in the technical and patent literature. See for example *Encyclopedia of Chemical Technology*, 1st ed., Vol. 12, page 106, et seq., published by Interscience Encyclopedia, Inc., New York. The Examples appended hereto are sufficiently general yet detailed to instruct one skilled in the art as how to synthesize any composition of matter herein defined by the Claims.

Aldehydes and ketones used to synthesize Schiff bases of the present invention are composed of moieties $R_1$ and $R_2$ which are hydrogen or aliphatic radicals both linear and branched. These aldehydes and ketones are of the general formula:

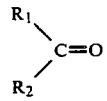

wherein the sum of the carbon atoms in the aldehyde or ketone is from 9 to 20. The preferred aldehydes and ketones are those mixtures containing from 10 to 15 carbon atoms. Preferred aldehydes are formed by the dehydrogenation of linear and branched primary alcohols. The methyl alkyl ketones are one preferred class of ketones. Another class of preferred ketones are those mixtures containing from 10 to 15 carbon atoms derived by the dehydrogenation of secondary alcohols from the boric acid directed oxidation of linear hydrocarbons containing 10 to 15 carbon atoms.

The preparation of these alcohols is disclosed in U.S. Pat. No. 3,410,913 as well as in other references. The ketones derived from these secondary alcohols may be prepared from the alcohols using standard methods of oxidation or catalytic hydrogenation, i.e., over copper chromate at 150°–275° C. This mixture of ketones, prepared as described, ordinarily contains at least 1 wt% but less than 35 wt% of aliphatic ketones in which one of the alkyl groups of the ketone, $R_1$ and $R_2$, is methyl.

The alkoxylated Schiff bases exhibit long lasting surfactant properties in aqueous solution in concentrations ranging from 0.01 wt% and higher depending upon the mode of application. The minimal concentration of ethoxylated product usually employed is about 0.1 wt% while the upper concentration, which is limited almost entirely by cost, for all but special purposes seldom exceeds 20 wt%. Usually the range of concentration is between about 1 wt% to 15 wt% with the residuum being detergent adjuvants described below. In all instances the lower or minimal concentration (0.01% by weight) is referred to as an "effective amount" of surfactant. When these stabilized products are employed as detergents they ordinarily are present in at least the minimal concentrations disclosed accompanied by one or more of the following classes of materials which are generically referred to as detergent adjuvants:

1. Inorganic salts, acids and bases. These are usually referred to as "builders." These salts usually comprise alkalies, phosphates and silicates of the alkali metals as well as their neutral soluble salts. These materials constitute from about 40 to 80 weight percent of the composition in which they are employed.

2. Organic builders or additives—These are substances which contribute to characteristics such as detergency, foaming power, emulsifying power or soil-suspending effect. Typical organic builders include sodium carboxymethyl cellulose, sequestering agents such as ethylenediaminetetraacetic acid and the fatty monoethanolamides, etc.

3. Special purpose additives—These include solubilizing additives such as lower alcohols, glycols and glycol ethers, bleaches or brighteners of various structures which share in common that they are dyestuffs and they do not absorb or reflect light in the visible range of the spectrum.

The present invention includes a class of surfactants with greatly improved hydrolytic stability over a range of pH values.

The composition of matter of the present invention differs from the Schiff bases of U.S. Pat. No. 3,897,362 by having methyl groups on the carbon alpha to the carbon of the C=N bond. Quite unexpectedly, this structural change renders the compounds of the present invention much more hydrolytically stable than the products of the prior art reference. This relative stability is an advantage in a detergent because of the high temperature conditions it is subjected to during use. On the other hand, the inherent hydrolytic instability of the C=N bond should lead to desirably high rates of primary degradation in waste water.

The product of the present invention are useful in household detergent products as well as in an enhanced oil recovery process surfactant formulation. The products of the present invention are also useful in alkaline based surfactants, and as emulsifiers or phase transfer promoters of chemical reactions capable of selective destruction by pH adjustment. Typical formulations are herein described.

| DETERGENT FORMULATIONS | |
|---|---|
| Parts by wt. | Components |
| A. Dry cleaning composition | |
| 10 | Potassium Oleate |
| 13 | Product Example I-A |
| 50 | Dry cleaning solvent |
| 24 | Water |
| 3 | n-Butanol |
| B. Washing Machine Composition | |
| 13 | Product Example I-A |
| 35 | Sodium tripolyphosphate |
| 30 | Sodium Silicate |
| 20 | Sodium Carbonate |
| 2 | Sodium Carboxymethyl Cellulose |
| C. Automatic Dishwasher Composition | |
| 5 | Product Example I-A |
| 34 | Sodium Silicate |
| 61 | Sodium Tripolyphosphate |
| D. Disinfectant and Detergent Composition | |
| 6.3 | Product Example I-A |
| 45 | Sodium Tripolyphosphate |
| 45 | Sodium Carbonate |
| 3.7 | Oleyl dimethyl ethyl ammonium bromide |

EXAMPLE I (A) ED-2001+2 Moles 2-Undecanone

A one-liter flask fitted with magnetic stirring bar, $N_2$ bubbling tube, Dean-Stark trap, condenser and thermometer was charged with 204 grams JEFFAMINE ® ED-2001 and 34 grams 2-undecanone. The solution was heated from 120° C. to 230° C. over a two hour period, collecting condensed overhead vapor (water) in the Dean-Stark trap. To complete the reaction, 0.5 grams p-toluenesulfonic acid was added and digestion resumed for one hour at 230° C. Infrared analysis of the pot material indicated that the desired reaction had taken place, i.e., presence of C=N bonds, disappearance of C=O bonds.

The product of this reaction was predominantly:

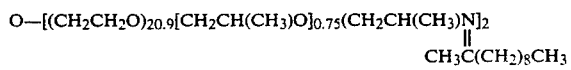

B. ED-2001+1.5 Moles 2-Undecanone

A one-liter flask fitted as in Example I-A was charged with 204 grams JEFFAMINE ®ED-2001 and 25.5 grams 2-undecanone. The mixture was digested for two hours at 170°–175° C. while removing volatiles followed by 6 hours digestion at 230° C. The product was identified by the same technique as in Example I-A as a mixture of the product of Example I-A and

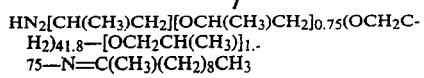

EXAMPLE II

ED-2001+Isobutyl Heptyl Ketone

The method of Example I-B was used with 204 grams JEFFAMINE®ED-2001 and 36.5 g isobutyl heptyl ketone. Initial digestion at 180° C. to 220° C. for two hours was followed by heating over seven hours from 220° C. to 265° C. while removing volatiles overhead.

The product was identified as:

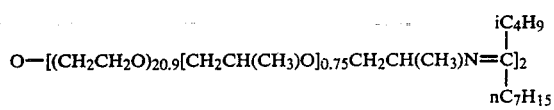

EXAMPLE III

ED-2001+2 Moles Nonanal

A mixture of 204 grams JEFFAMINE®ED-2001 and 39 g nonanal was heated under nitrogen with magnetic stirring for two hours at 175°–180° C. while removing volatiles. Product contained virtually no carbonyl compounds or C=C indicating self condensation of aldehydes based on infrared analysis.

Product was identified as predominantly:

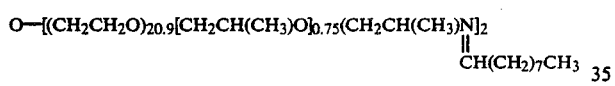

EXAMPLE IV

M-1000+1 Mole 2-Undecanone

The method of Example I-B was used with 204 grams JEFFAMINE®M-1000 and 34 grams 2-undecanone. Initial digestion from 120° C. to 230° C. over 3½ hours was followed by 7½ hours heating slowly from 230° C. to 280° C.

The product was identified as:

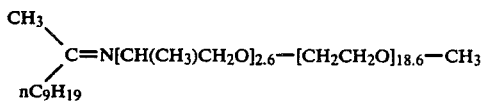

EXAMPLE V

M-1000+2 Mole of a C14-C15 Ketone Mixture

The method of Example I-B was used with 150 grams JEFFAMINE®M-1000 and 32 grams C14-15 ketone (synthesized by catalytic dehydrogenation of a random secondary alcohol mixture prepared by boric acid-directed air oxidation of C14-15 n-paraffins) with 214 average molecular weight. Initial digestion was for two hours at 170° C. to 225° C. followed by 7½ hours heating from 225° C. to 275° C. while removing volatiles.

Infrared analysis of the pot material indicated that the desired reaction had taken place. Analysis showed the presence of C=N bonds and the absence of C=O bonds.

EXAMPLE VI

M-360+2 Undecanone

The method of Example I-B was used with 170 grams 2-undecanone and 365 grams JEFFAMINE®M-360.* Mixture was digested for 3½ hours at 180° C. while discarding water evolved and recycling overhead organics. Raised temperature from 180° C. to 250° C. over 2 hours 10 minutes followed by 2 hours at 250° C. discarding all overhead. Product was identified by infrared spectroscopy:

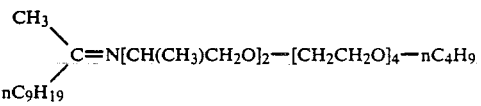

*Characterized by the formula

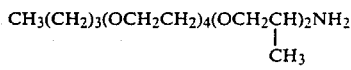

and marketed by Texaco Chemical Company.

This product, which contains only 34 wt% (CH$_2$CH$_2$O), was found to be insoluble in water from 0°–100° C.

EXAMPLE VII

Interfacial Tension Measurements of Surfactants vs. Mineral Oil in Aqueous Solution The interfacial tension of several products was measured. The results are reported here.

| Product of Example | Interfacial Tension (dynes/cm) | |
| --- | --- | --- |
|  | 0.1% | 1.0% |
| I-A | 12 | 10.6 |
| II | 14.7 | 9.4 |
| III | 12.2 | 10.8 |
| V | 5.6 | 5.1 |

EXAMPLE VIII

Hydrolytic Stability Studies on Product of Example I-A

The aqueous stability test of U.S. Pat. No. 3,897,362, Example 6, was repeated on 0.6% aqueous solutions of the product of Example I-A at pH 5.6, 7.7, and 12.2. After 24 hours at 70° C. these solutions exhibited no cloudiness and maintained their original cloud point temperature of approximately 100° C. This is in marked contrast to the rapid decomposition (in <1 to 30 minutes) exhibited by Schiff base surfactants of U.S. Pat. No. 3,897,362.

TABLE I

| TIME IN MINUTES FOR DECOMPOSITION OF PRODUCT OF THE PRESENT INVENTION | |
| --- | --- |
| pH | PRODUCT FOR EXAMPLE I-A |
| 5.6 | >1440 |
| 7.7 | >1440 |
| 12.2 | >1440 |

The results of a similar test from U.S. Pat. No. 3,897,362 are herein reproduced in Table 2.

TABLE 2

TIME IN MINUTES FOR DECOMPOSITION OF
PRODUCTS OF U.S. PAT. NO. 3,897,362
PREPARED IN THE VARIOUS EXAMPLES

| | PRODUCT FROM EXAMPLE | | | | | | | |
|---|---|---|---|---|---|---|---|---|
| pH | 1 | 2 | 3A | 4 | 5A | 5B | 5C | 5D |
| 5.6 | 9 | 20 | 6 | 5 | <1 | <1 | <1 | <1 |
| 7.7 | 13 | 20 | 6 | 5.5 | <1 | <1 | <1 | <1 |
| 13.0 | 30 | 30 | 6.5 | 6.5 | <1 | <1 | <1 | <1 |

EXAMPLE IX

Additional Hydrolytic Stability Tests

Prepared 1% aqueous solutions of products of Example I-A, II, and V; placed in oven at 70° C. for 17 hours; and ran interfacial tension measurements as in Example VII. Results were 9.4, 6.3 and 2.1 dynes/cm, respectively, indicating that no measurable decomposition to starting materials had taken place. Those results were confirmed by separate measurements on expected decomposition products in water at equivalent concentrations which gave high interfacial tension values.

The principle of the invention and the best mode contemplated for applying that principle have been described. It is to be understood that the foregoing is illustrative only and that other means and techniques can be employed without departing from the true scope of the invention defined in the following Claims:

What is claimed is:

1. A composition of matter of the general formula:

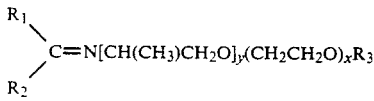

wherein:
R$_1$ and R$_2$ are selected from the group consisting of an hydrogen and an alkyl radical such that the sum of the carbon atoms in R$_1$—C—R$_2$ is from 9 to 20;
R$_3$ is the radical

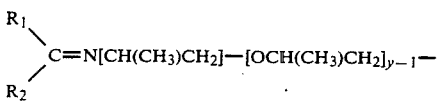

y has an average value of from 1 to 3 and
x has an average value of from 8 to 60 such that the amount of (CH$_2$CH$_2$O) is not less than 40 wt%.

2. The composition of matter of claim 1 wherein x has an average value of from 8 to 50.
3. The composition of matter of claim 1 wherein y averages 1.75 and x averages 8.7.
4. The composition of matter of claim 1 wherein y averages 1.75 and x averages 15.6.
5. The composition of matter of claim 1 wherein y averages 1.75 and x averages 41.8.
6. The composition of matter of claim 1 wherein the sum of the carbon atoms of R$_1$—C—R$_2$ is from 10 to 15.
7. An aqueous solution comprising water and from 0.1 wt% to 20 wt% of a Schiff base of the general formula:

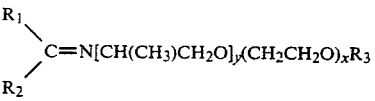

wherein:
R$_1$ and R$_2$ are selected from the group consisting of an hydrogen and an alkyl radical such that the sum of the carbon atoms in R$_1$—C—R$_2$ is from 9 to 20;
R$_3$ is the radical

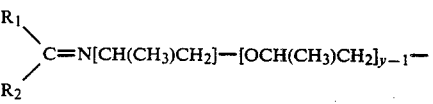

y has an average value of from 1 to 3 and
x has an average value of from 8 to 60 such that the amount of (CH$_2$CH$_2$O) is not less than 40 wt% of the Schiff base.

8. The aqueous solution of claim 7 which comprises from 1 wt% to 15 wt% of the Schiff base.
9. The aqueous solution of claim 7 which comprises detergent adjuvants.

* * * * *